United States Patent
Nishikawa

(10) Patent No.: US 8,767,852 B2
(45) Date of Patent: Jul. 1, 2014

(54) COMMUNICATION APPARATUS AND COMMUNICATION METHOD

(75) Inventor: Nobuyoshi Nishikawa, Osaka (JP)

(73) Assignee: Icom Incorporated (JP)

( * ) Notice: Subject to any disclaimer, the term of this patent is extended or adjusted under 35 U.S.C. 154(b) by 59 days.

(21) Appl. No.: 13/531,766

(22) Filed: Jun. 25, 2012

(65) Prior Publication Data

US 2013/0107982 A1     May 2, 2013

(30) Foreign Application Priority Data

Oct. 26, 2011 (JP) ................................. 2011-234629

(51) Int. Cl.
*H04K 1/10* (2006.01)

(52) U.S. Cl.
USPC ............................................ 375/260; 455/59

(58) Field of Classification Search
USPC ........................................................ 375/260
See application file for complete search history.

(56) References Cited

U.S. PATENT DOCUMENTS

| | | | | |
|---|---|---|---|---|
| 6,445,739 B1* | 9/2002 | Shen et al. | ............... | 375/240.03 |
| 2004/0266369 A1* | 12/2004 | McCallister | ............... | 455/115.1 |
| 2005/0013381 A1* | 1/2005 | Suh et al. | ...................... | 375/260 |
| 2007/0093252 A1* | 4/2007 | Rahman et al. | ............... | 455/450 |
| 2007/0172000 A1* | 7/2007 | Hamamoto et al. | .......... | 375/324 |
| 2007/0291635 A1* | 12/2007 | Yang et al. | ..................... | 370/208 |
| 2011/0096767 A1* | 4/2011 | Narayan et al. | ............... | 370/342 |
| 2011/0235740 A1* | 9/2011 | Harada et al. | ................. | 375/295 |
| 2012/0183083 A1* | 7/2012 | Kolze | ............................. | 375/254 |
| 2012/0183110 A1* | 7/2012 | Kolze et al. | ................... | 375/350 |
| 2012/0269234 A1* | 10/2012 | Zhang et al. | .................. | 375/143 |
| 2013/0058432 A1* | 3/2013 | Futatsugi et al. | ............. | 375/296 |
| 2013/0128996 A1* | 5/2013 | Nishikawa | .................... | 375/260 |
| 2013/0230130 A1* | 9/2013 | Kolze et al. | ................... | 375/349 |

FOREIGN PATENT DOCUMENTS

JP       2006-165781 A     6/2006

* cited by examiner

*Primary Examiner* — Chieh Fan
*Assistant Examiner* — Santiago Garcia
(74) *Attorney, Agent, or Firm* — Baker & McKenzie LLP

(57) ABSTRACT

A modulator modulates an input signal by a predetermined modulation scheme to generate a modulation signal. A serial-parallel converter performs serial-parallel conversion of the modulation signal and assigns the modulation signal to subcarriers with frequency components orthogonal to each other, thereby generating a subcarrier modulation signal. A synthesizer generates a baseband signal from the subcarrier modulation signal based on a predetermined transformation matrix. The predetermined transformation matrix is a matrix which indicates inverse discrete Fourier transformation and is divided into a plurality of square matrices identical in the number of rows and the number of columns, and in which elements other than elements of a plurality of diagonally positioned square matrices are set to 0. A transmitter generates a transmission signal from the baseband signal, and transmits the transmission signal to another apparatus via an antenna.

6 Claims, 8 Drawing Sheets

FIG. 9A

| $A_{11}$ | 0 | 0 | 0 |
|---|---|---|---|
| 0 | 0 | 0 | $A_{24}$ |
| 0 | $A_{32}$ | 0 | 0 |
| 0 | 0 | $A_{43}$ | 0 |

$\cdot \begin{bmatrix} d_0 \\ d_1 \\ d_2 \\ d_3 \\ d_4 \\ d_5 \\ d_6 \\ d_7 \end{bmatrix}$

FIG. 9B

| $A_{11}$ | 0 | 0 | 0 |
|---|---|---|---|
| 0 | $A_{24}$ | 0 | 0 |
| 0 | 0 | $A_{32}$ | 0 |
| 0 | 0 | 0 | $A_{43}$ |

$\cdot \begin{bmatrix} d_0 \\ d_1 \\ d_6 \\ d_7 \\ d_2 \\ d_3 \\ d_4 \\ d_5 \end{bmatrix}$

COMMUNICATION APPARATUS AND COMMUNICATION METHOD

CROSS REFERENCES TO RELATED APPLICATION

This application claims the benefit of Japanese Patent Application No. 2011-234629 filed on Oct. 26, 2011, the entire disclosure of which is incorporated by reference herein.

FIELD

This application relates to a communication apparatus and communication method.

BACKGROUND

In OFDM (Orthogonal Frequency-Division Multiplexing) communication, an input signal is modulated with subcarriers, and the modulated input signal is subjected to an IFFT (Inverse Fast Fourier Transformation) to generate a baseband signal. When the number of subcarriers increases to increase the FFT (Fast Fourier Transformation) size, therefore, a baseband signal with a high peak is generated, increasing the PAPR (Peak-to-Average Power Ratio). The increase in the PAPR needs an amplifier having a wide range of linearity to transfer a signal without distortion. To meet the requirement, techniques of reducing the PAPR are developed.

Unexamined Japanese Patent Application KOKAI Publication No. 2006-165781 discloses a technique of controlling the phase of a subcarrier modulation signal based on the optimal phase, calculated by a sequential decision procedure, prior to an IFFT in order to reduce the PAPR.

The OFDM communication needs to cope with reducing the PAPR. The technique disclosed in Unexamined Japanese Patent Application KOKAI Publication No. 2006-165781 needs to control the phase subcarrier by subcarrier by repeatedly calculating the optimal phase to reduce the PAPR.

SUMMARY

Accordingly, it is an object of the present invention to suppress an increase in PAPR which is caused by an increase in the number of subcarriers in OFDM communication to thereby simplify the process of suppressing an increase in PAPR.

To achieve the object, according to first aspect of the invention, there is provided a communication apparatus for communicating with another apparatus in orthogonal frequency-division multiplexing wireless communication, the communication apparatus comprising:

a modulator that modulates an input signal by a predetermined modulation scheme, and assigns the modulated input signal to subcarriers with frequency components orthogonal to each other, thereby generating a subcarrier modulation signal;

a synthesizer that generates a baseband signal from the subcarrier modulation signal using a predetermined transformation matrix to modulate the subcarrier modulation signal with the subcarriers, the predetermined transformation matrix being a non-singular matrix with predetermined elements of 0; and a transmitter that generates a transmission signal from the baseband signal, and transmits the transmission signal.

It is preferable that the transformation matrix may be a matrix in which elements other than elements of a plurality of square matrices diagonally positioned in the transformation matrix are 0, a sum of numbers of rows and a sum of numbers of columns of the plurality of square matrices may coincide with a number of rows and a number of columns of the transformation matrix, and each element of each of the square matrices may have a same value as an element at a same position as the each element in a matrix having a same size as that of the transformation matrix and indicating inverse discrete Fourier transformation.

It is preferable that the transformation matrix may be a matrix in which elements other than elements of a plurality of square matrices diagonally positioned in the transformation matrix are 0, a sum of numbers of rows and a sum of numbers of columns of the plurality of square matrices may coincide with a number of rows and a number of columns of the transformation matrix, and each element of each of the square matrices may have a value obtained by multiplying each element in a matrix having a same size as that of the each square matrix and indicating inverse discrete Fourier transformation by a complex trigonometric function having, as a phase, a value determined for each of the square matrices but with an inverted sign.

It is preferable the value determined for each of the square matrices may be a value obtained by multiplying a number identifying the square matrix by a phase of a half period of the subcarriers and dividing by the number of rows of the transformation matrix.

It is preferable that all of the square matrices may be identical in the number of rows and the number of columns.

According to a second aspect of the invention, there is provided a communication apparatus for communicating with another apparatus in orthogonal frequency-division multiplexing wireless communication, the communication apparatus comprising:

a receiver that receives a transmission signal and generates a baseband signal;

a decomposer that generates a subcarrier modulation signal from the baseband signal using a reception transformation matrix which is an inverse matrix of a predetermined transformation matrix to modulate the subcarrier modulation signal with subcarriers, the predetermined transformation matrix being a non-singular matrix with predetermined elements of 0; and a demodulator that demodulates the subcarrier modulation signal by a predetermined demodulation method.

It is preferable that the reception transformation matrix may be a matrix in which elements other than elements of a plurality of square matrices diagonally positioned in the reception transformation matrix are 0, a sum of numbers of rows and a sum of numbers of columns of the plurality of square matrices may coincide with a number of rows and a number of columns of the reception transformation matrix, and each of the square matrices may be an inverse matrix of a square matrix which is located at a same position as the each square matrix in the predetermined transformation matrix.

It is preferable that the reception transformation matrix may be a matrix in which elements other than elements of a plurality of square matrices diagonally positioned in the reception transformation matrix are 0, a sum of numbers of rows and a sum of numbers of columns of the plurality of square matrices may coincide with a number of rows and a number of columns of the reception transformation matrix, and each element of each of the square matrices may have a value obtained by multiplying each element in a matrix having a same size as that of the each square matrix and indicating inverse discrete Fourier transformation by a complex trigonometric function having, as a phase, a value determined for each of the square matrices.

It is preferable that the value determined for each of the square matrices may be a value obtained by multiplying a number identifying the square matrix by a phase of a half period of the subcarriers and dividing by the number of rows of the reception transformation matrix.

It is preferable that all of the square matrices may be identical in the number of rows and the number of columns.

According to a third aspect of the invention, there is provided a communication method that is executed by a communication apparatus communicating with another apparatus in orthogonal frequency-division multiplexing wireless communication, the communication method comprising:

a modulation step of modulating an input signal by a predetermined modulation scheme, and assigning the modulated input signal to subcarriers with frequency components orthogonal to each other, thereby generating a subcarrier modulation signal;

a synthesizing step of generating a baseband signal from the subcarrier modulation signal using a predetermined transformation matrix to modulate the subcarrier modulation signal with the subcarriers, the predetermined transformation matrix being a non-singular matrix with predetermined elements of 0; and a transmission step of generating a transmission signal from the baseband signal, and transmitting the transmission signal.

According to a fourth aspect of the invention, there is provided a communication method that is executed by a communication apparatus communicating with another apparatus in orthogonal frequency-division multiplexing wireless communication, the communication method comprising:

a reception step of receiving a transmission signal and generates a baseband signal;

a decomposing step of generating a subcarrier modulation signal from the baseband signal using a reception transformation matrix which is an inverse matrix of a predetermined transformation matrix to modulate the subcarrier modulation signal with subcarriers, the predetermined transformation matrix being a non-singular matrix with predetermined elements of 0; and a demodulation step of demodulating the subcarrier modulation signal by a predetermined demodulation method.

With the foregoing configurations, the invention can suppress an increase in PAPR which is caused by an increase in the number of subcarriers in OFDM (Orthogonal Frequency-Division Multiplexing) communication to thereby simplify the process of suppressing an increase in PAPR.

BRIEF DESCRIPTION OF THE DRAWINGS

A more complete understanding of this application can be obtained when the following detailed description is considered in conjunction with the following drawings, in which:

FIGS. 9A and 9B are diagrams illustrating transformation examples of elements of a transformation matrix according to the embodiments.

DETAILED DESCRIPTION

Exemplary embodiments of the invention will be described in detail hereinbelow with reference to the accompanying drawings.

First Embodiment

Figure 1:
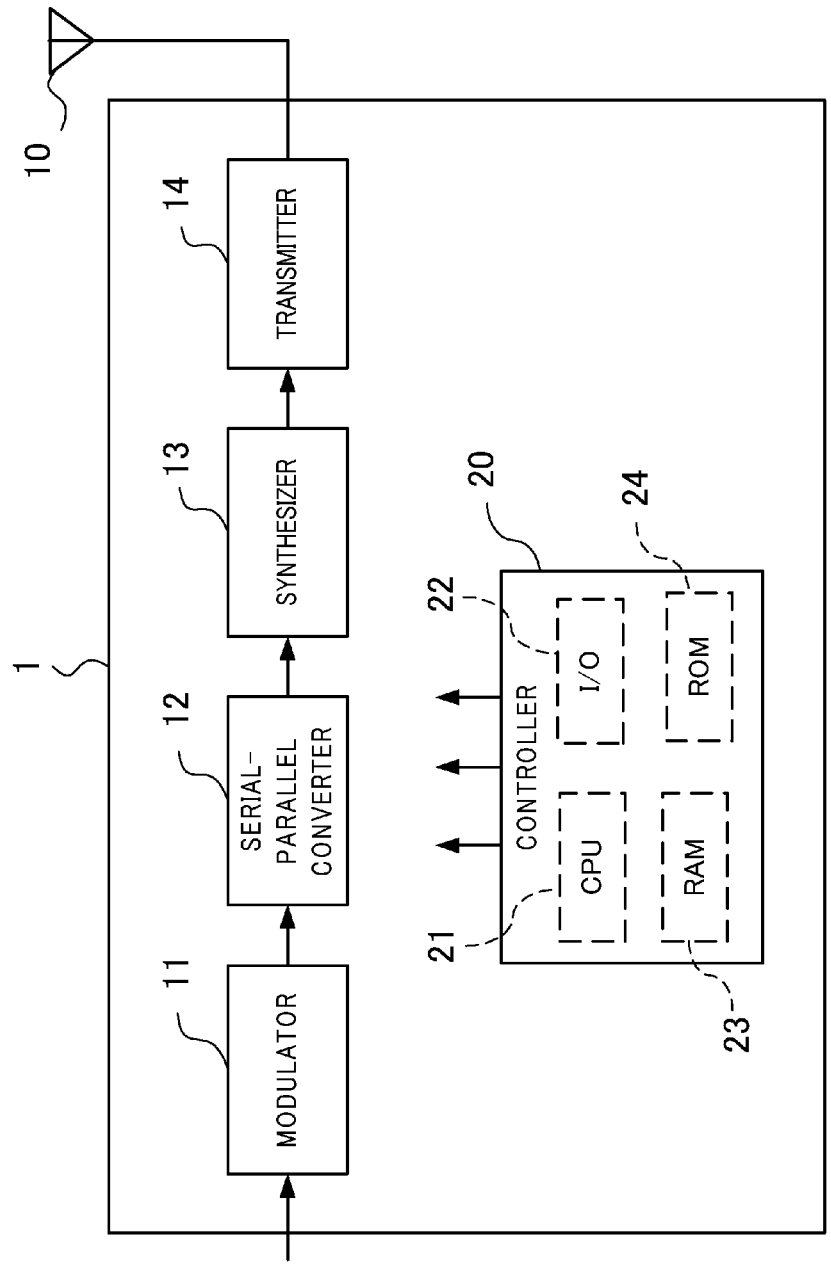
FIG. 1 is a block diagram illustrating a configuration example of a communication apparatus according to a first embodiment of the invention.

FIG. 1 is a block diagram illustrating a configuration example of a communication apparatus 1 according to a first embodiment of the invention. The communication apparatus 1 communicates with another apparatus using OFDM wireless communication. The communication apparatus 1 includes an antenna 10, a modulator 11, a serial-parallel converter 12, a synthesizer 13, a transmitter 14, and a controller 20.

The controller 20 includes a CPU (Central Processing Unit) 21, RAM (Random Access Memory) 23, and ROM (Read-Only Memory) 24. Although signal lines from the controller 20 to the individual components are omitted to avoid complication and for the ease of understanding, the controller 20 is connected to the individual components of the communication apparatus 1 via an I/O (Input/Output) unit 22 to start and terminate the processes of the components and control the contents of the processes.

The RAM 23 stores data for generating a transmission frame, for example. The ROM 24 stores a control program for the controller 20 to control the operation of the communication apparatus 1. The controller 20 controls the communication apparatus 1 based on the control program.

Figure 2:
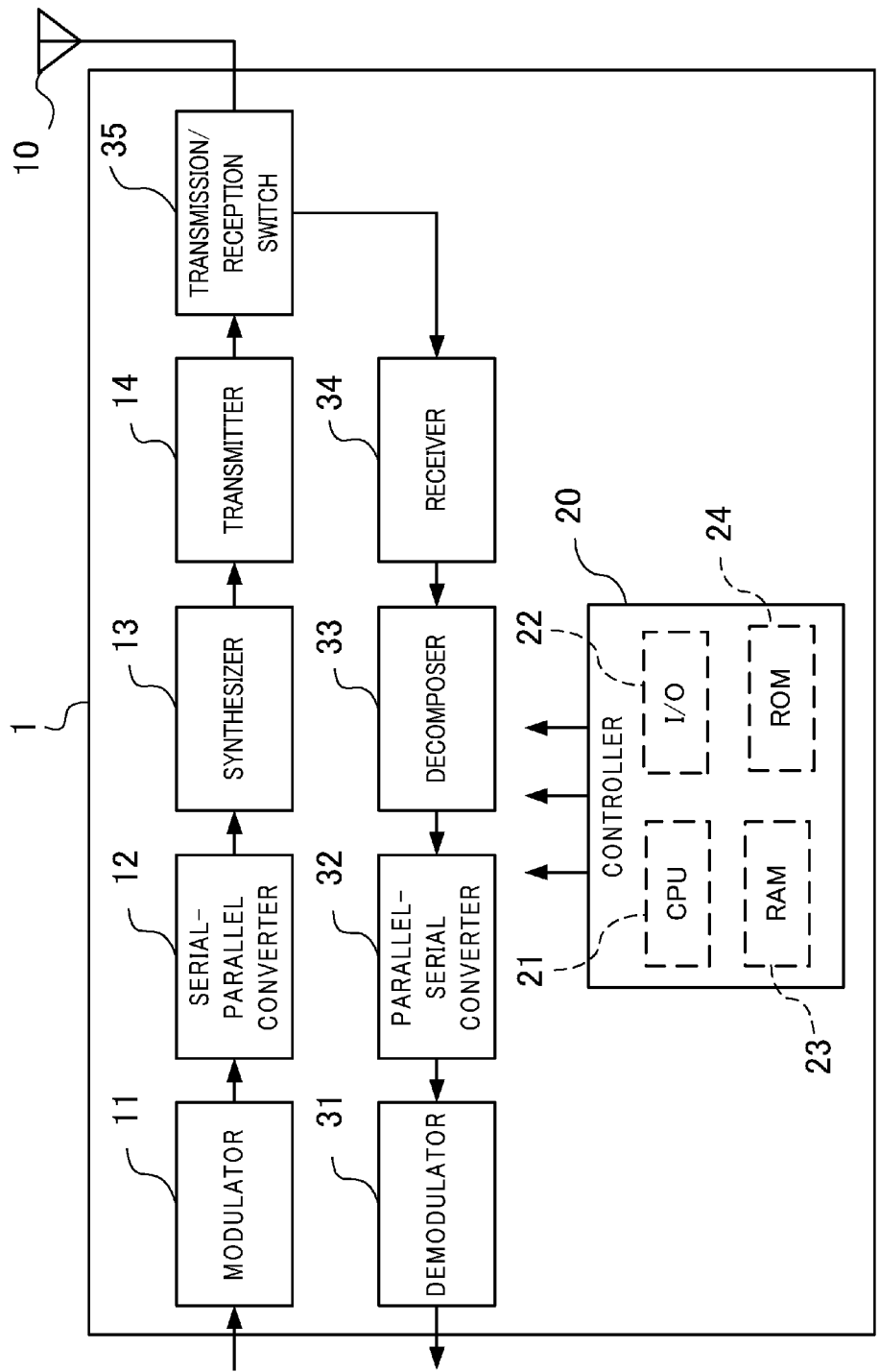
FIG. 2 is a block diagram illustrating a different configuration example of the communication apparatus according to the first embodiment.

FIG. 2 is a block diagram illustrating a different configuration example of the communication apparatus 1 according to the first embodiment. To provide the communication apparatus 1 with a reception function, the communication apparatus 1 shown in FIG. 2 further includes a demodulator 31, a parallel-serial converter 32, a decomposer 33, a receiver 34, and a transmission/reception switch 35. Referring to the communication apparatus 1 shown in FIG. 2 that has the transmission function and the reception function, a communication method that is carried out by the communication apparatus 1 will be described below.

The modulator 11 modulates an input signal by a predetermined modulation scheme to generate a modulation signal. The modulator 11 sends the generated modulation signal to the serial-parallel converter 12. The modulator 11 uses, for example, QPSK (Quadrature Phase-Shift Keying) as the modulation scheme. The serial-parallel converter 12 performs serial-parallel conversion on the modulation signal to generate a parallel signal, and assigns the generated parallel signal to subcarriers with frequency components orthogonal to each other to generate a subcarrier modulation signal. The serial-parallel converter 12 sends the generated subcarrier modulation signal to the synthesizer 13.

The synthesizer 13 modulates the subcarrier modulation signal with subcarriers to which parallel signals are respectively assigned, using a predetermined transformation matrix, and synthesizes the modulated signals to generate a baseband signal. The transformation matrix is a non-singular matrix with predetermined elements having values of 0. The synthesizer 13 uses, as a transformation matrix, a non-singular matrix in which the values of predetermined elements are set to 0 by adding a mathematical change to a matrix indicating an IDFT (Inverse Discrete Fourier Transformation). A matrix indicating an IDFT with the number of rows and the number of columns being N is expressed by the following equation (1). ω in the equation (1) is expressed by the following equation (2) where j is an imaginary unit.

[Equation 1]

$$F_N^{-1} = \frac{1}{\sqrt{N}} \begin{bmatrix} 1 & 1 & 1 & \cdots & 1 \\ 1 & \omega^1 & \omega^2 & \cdots & \omega^{(N-1)} \\ 1 & \omega^2 & \omega^4 & \cdots & \omega^{2(N-1)} \\ \vdots & \vdots & \vdots & \ddots & \vdots \\ 1 & \omega^{(N-1)} & \omega^{(N-1)2} & \cdots & \omega^{(N-1)(N-1)} \end{bmatrix} \quad (1)$$

[Equation 2]

$$\omega = \exp\left(j\frac{2\pi}{N}\right) \quad (2)$$

Figure 3A:
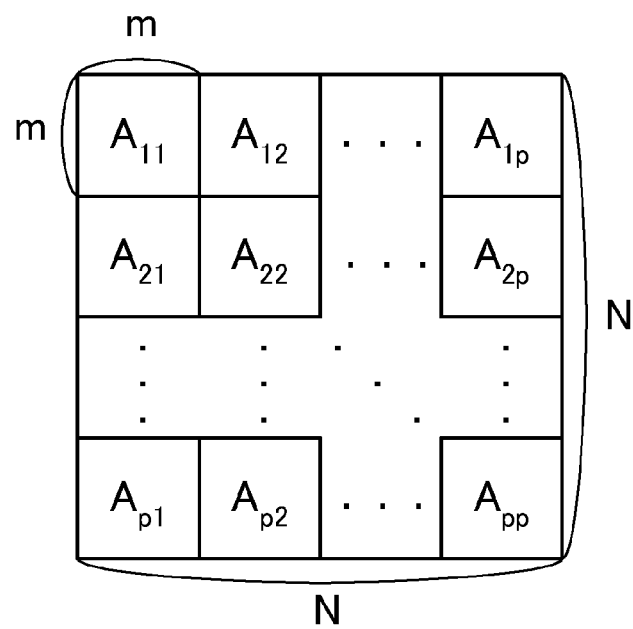
FIGS. 3A and 3B are diagrams illustrating an example of a transformation matrix according to the first embodiment.
Figure 3B:
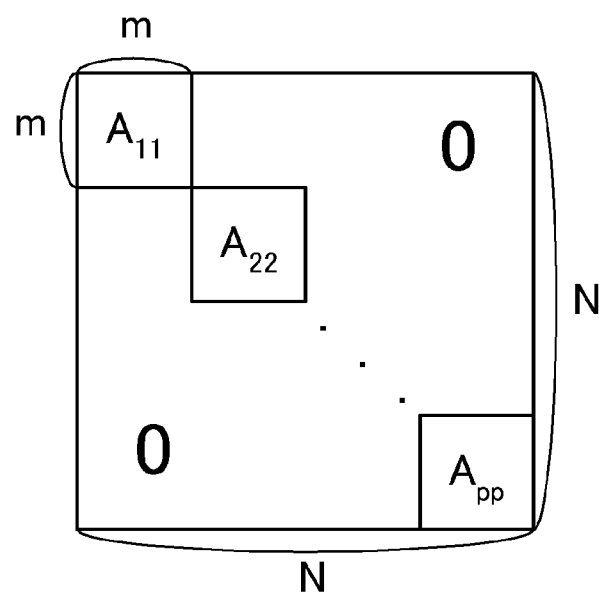

FIGS. 3A and 3B are diagrams illustrating an example of the transformation matrix according to the first embodiment. FIG. 3A shows a matrix indicating an IDFT given by the equation (1) divided into p×p square matrices each having the same number of rows as the number of columns which is m. p is an arbitrary value which permits a matrix indicating an IDFT to be divided into a plurality of square matrices each having the same number of rows as the number of columns. The transformation matrix shown in FIG. 3B is a matrix in which elements, excluding the elements of a plurality of square matrices that are diagonally positioned in the matrix indicating an IDFT shown in FIG. 3A and the sum of whose numbers of rows and the sum of whose numbers of columns coincide with the number of rows and the number of columns of the transformation matrix, i.e., elements other than the elements of $A_{11}, A_{22}, \ldots, A_{pp}$, are set to 0. The synthesizer 13 uses the matrix shown in FIG. 3B, for example, as a transformation matrix.

Specifically, when the number of subcarriers is 64, a matrix indicating an IDFT with 64 rows and 64 columns is divided into, for example, 16×16 square matrices with 4 rows and 4 columns each. The synthesizer 13 generates a baseband signal from the subcarrier modulation signal using a transformation matrix in which elements other than the elements of diagonally positioned square matrices $A_{11}, A_{22}, \ldots, A_{1616}$ each of a 4×4 size are set to 0.

When the number of subcarriers is 8, a matrix indicating an IDFT with 8 rows and 8 columns is divided into, for example, 2×2 square matrices. The synthesizer 13 uses a transformation matrix in which elements other than the elements of diagonally positioned square matrices are set to 0. The synthesizer 13 generates a baseband signal by multiplying the transformation matrix by a subcarrier modulation signal d as expressed by the following equation (3) where ω is given by the following equation (4).

[Equation 3]

$$\frac{1}{\sqrt{8}} \begin{bmatrix} 1 & 1 & 1 & 1 & 0 & 0 & 0 & 0 \\ 1 & \omega^1 & \omega^2 & \omega^3 & 0 & 0 & 0 & 0 \\ 1 & \omega^2 & \omega^4 & \omega^6 & 0 & 0 & 0 & 0 \\ 1 & \omega^3 & \omega^6 & \omega^9 & 0 & 0 & 0 & 0 \\ 0 & 0 & 0 & 0 & \omega^{16} & \omega^{20} & \omega^{24} & \omega^{28} \\ 0 & 0 & 0 & 0 & \omega^{20} & \omega^{25} & \omega^{30} & \omega^{35} \\ 0 & 0 & 0 & 0 & \omega^{24} & \omega^{30} & \omega^{36} & \omega^{42} \\ 0 & 0 & 0 & 0 & \omega^{28} & \omega^{35} & \omega^{42} & \omega^{49} \end{bmatrix} \cdot \begin{bmatrix} d_0 \\ d_1 \\ d_2 \\ d_3 \\ d_4 \\ d_5 \\ d_6 \\ d_7 \end{bmatrix} \quad (3)$$

[Equation 4]

$$\omega = \exp\left(j\frac{\pi}{4}\right) \quad (4)$$

In the transformation matrix shown in FIG. 3B, the number of rows and the number of columns of every square matrix are the same. When dividing lines which divide a matrix indicating an IDFT are symmetrical to the diagonal line, however, the scheme of dividing a matrix indicating an IDFT is not limited to the aforementioned scheme, and the individual square matrices may have different numbers of rows and columns. The PAPR (Peak-to-Average Power Ratio) of a baseband signal can be reduced by setting those of the elements of the transformation matrix that exclude the elements of diagonally positioned square matrices to 0. When every square matrix has the same numbers of rows and columns, it is possible to allow, for example, a plurality of operating units to perform operations on square matrices of the same size associated therewith in parallel, thereby shortening the time needed for calculation on the entire transformation matrix, or to allow a single operating unit to perform operations on a plurality of square matrices.

The synthesizer 13 sends the baseband signal to the transmitter 14. The transmitter 14 generates a transmission signal from the baseband signal, and sends the transmission signal to another apparatus via the transmission/reception switch 35 and the antenna 10.

Figure 4:
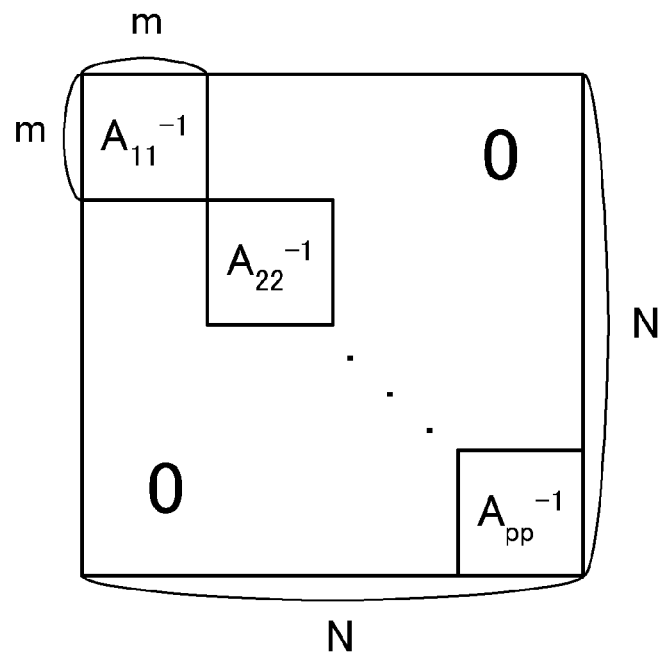
FIG. 4 is a diagram illustrating an example of a reception transformation matrix according to the first embodiment.

The receiver 34 receives the transmission signal via the antenna 10 and the transmission/reception switch 35, and generates a baseband signal. The receiver 34 sends the generated baseband signal to the decomposer 33. The decomposer 33 generates a subcarrier modulation signal from the baseband signal using a predetermined reception transformation matrix. The reception transformation matrix is an inverse matrix of the transformation matrix used by the synthesizer 13 on the transmission side. FIG. 4 is a diagram illustrating an example of the reception transformation matrix according to the first embodiment. The reception transformation matrix has a structure similar to that of the transformation matrix used on the transmission side, and is a non-singular matrix with predetermined elements having values of 0. As shown in FIG. 4, individual square matrices diagonally positioned in the reception transformation matrix are each inverse matrices of square matrices at the same positions in the transformation matrix shown in FIG. 3B as the diagonally positioned square matrices.

When the number of subcarriers is 64, the decomposer 33 generates a subcarrier modulation signal from the baseband signal using the reception transformation matrix in which elements other than the elements of diagonally positioned square matrices $A_{11}^{-1}, A_{22}^{-1}, \ldots, A_{1616}^{-1}$ having 64 rows and 64 columns and having, for example, a 4×4 size are set to 0.

$A_{11}^{-1}, A_{22}^{-1}, \ldots, A_{1616}^{-1}$ are inverse matrices of square matrices $A_{11}, A_{22}, \ldots, A_{1616}$ diagonally positioned in the transformation matrix used on the transmission side.

When the number of subcarriers is 8, the decomposer 33 generates a subcarrier modulation signal by multiplying a reception transformation matrix expressed by the following equation (5) by a parallel signal r which is generated by parallelization of the baseband signal. $A_{11}^{-1}$ and $A_{22}^{-1}$ are inverse matrices of $A_{11}$ and $A_{22}$, respectively. $A_{11}$ and $A_{22}$ are expressed by the following equation (6).

[Equation 5]

$$\begin{bmatrix} A_{11}^{-1} & 0 \\ 0 & A_{22}^{-1} \end{bmatrix} \cdot \begin{bmatrix} r_0 \\ r_1 \\ r_2 \\ r_3 \\ r_4 \\ r_5 \\ r_6 \\ r_7 \end{bmatrix} \quad (5)$$

[Equation 6]

$$A_{11} = \frac{1}{\sqrt{8}} \begin{bmatrix} 1 & 1 & 1 & 1 \\ 1 & \omega^1 & \omega^2 & \omega^3 \\ 1 & \omega^2 & \omega^4 & \omega^6 \\ 1 & \omega^3 & \omega^6 & \omega^9 \end{bmatrix} \quad (6)$$

$$A_{22} = \frac{1}{\sqrt{8}} \begin{bmatrix} \omega^{16} & \omega^{20} & \omega^{24} & \omega^{28} \\ \omega^{20} & \omega^{25} & \omega^{30} & \omega^{35} \\ \omega^{24} & \omega^{30} & \omega^{36} & \omega^{42} \\ \omega^{28} & \omega^{35} & \omega^{42} & \omega^{49} \end{bmatrix}$$

As in the case of the transformation matrix, the individual square matrices in the reception transformation matrix may have different numbers of rows and columns.

The decomposer 33 sends the subcarrier modulation signal to the parallel-serial converter 32. The parallel-serial converter 32 performs parallel-serial conversion on the subcarrier modulation signal to generate a serial signal. The demodulator 31 demodulates the serial signal by a predetermined demodulation scheme. For example, the demodulator 31 performs QPSK demodulation on the serial signal.

As described above, the communication apparatus 1 according to the first embodiment of the invention uses a transformation matrix which is acquired by adding a mathematical change to a matrix indicating an IDFT to suppress an increase in PAPR which is caused by an increase in the number of subcarriers in OFDM communication, thereby simplifying the process of suppressing an increase in PAPR.

Second Embodiment

The configuration of the communication apparatus 1 according to a second embodiment of the invention and the operations of the individual components thereof are similar to those of the first embodiment. The communication apparatus 1 according to the second embodiment uses a transformation matrix and a reception transformation matrix which are different from those used in the first embodiment.

Figure 5:
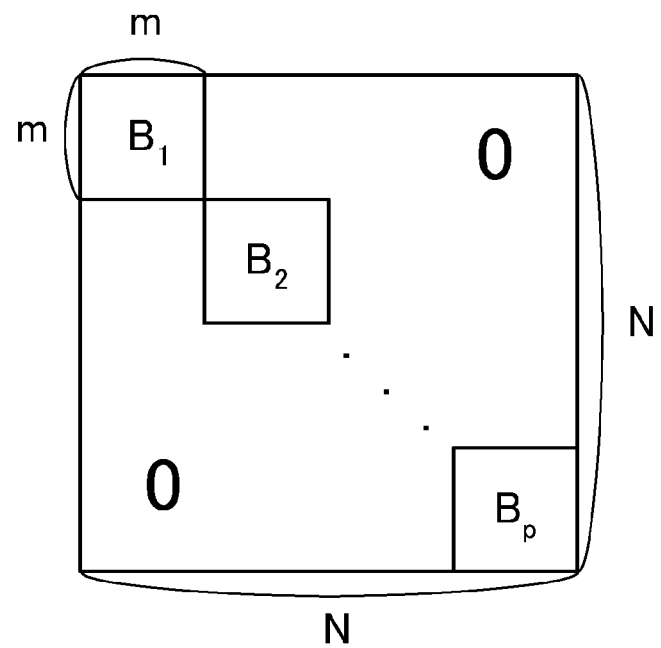
FIG. 5 is a diagram illustrating an example of a transformation matrix according to a second embodiment of the invention.

FIG. 5 is a diagram illustrating an example of a transformation matrix used in the second embodiment of the invention. A plurality of square matrices $B_1$ to $B_p$ are diagonally positioned in the transformation matrix. The square matrices $B_1$ to $B_p$ each have m rows and m columns, and the sum of the numbers of rows and the sum of the numbers of columns of the square matrices $B_1$ to $B_p$ coincide with the number of rows and the number of columns of the transformation matrix. Of the elements of the transformation matrix, those excluding the elements of the square matrices $B_1$ to $B_p$ are 0. Each of the square matrices $B_1$ to $B_p$ is a matrix obtained by multiplying the individual elements of a matrix indicating an IDFT having m rows and m columns by a complex trigonometric function $\omega'_i$ whose phase is a sign-inverted value of a value $\theta_i$ determined for each square matrix given by the following equation (7).

[Equation 7]

$$\omega'_i = \exp(-j\theta_i)(i=1,2,\ldots,p) \quad (7)$$

$\theta_i$ in use is a value obtained by, for example, multiplying a number i identifying a square matrix by the phase, $\pi$, of the half period of subcarriers and dividing the resultant value by the number of rows, N, of the transformation matrix, as given by the following equation (8). The scheme of calculating $\theta_i$ is not limited to the following equation (8).

[Equation 8]

$$\theta_i = \frac{i\pi}{N} \quad (i = 1, 2, \ldots, p) \quad (8)$$

In the transformation matrix shown in FIG. 5, every square matrix has the same number of rows and the same number of columns. If the sum of numbers of rows and the sum of numbers of columns of a plurality of diagonally positioned square matrices coincide with the number of rows and the number of columns of the transformation matrix, however, the individual square matrices may be different in the number of rows and the number of columns. The PAPR of the baseband signal can be reduced by setting elements other than the elements of the diagonally positioned square matrices to 0. When every square matrix has the same number of rows and the same number of columns, it is possible to allow, for example, a plurality of operating units to perform operations on square matrices of the same size associated therewith in parallel, thereby shortening the time needed for calculation on the entire transformation matrix, or to allow a single operating unit to perform operations on a plurality of square matrices.

When the number of subcarriers is 64, the synthesizer 13 generates a baseband signal from the subcarrier modulation signal using a transformation matrix in which elements other than the elements of diagonally positioned square matrices $B_1$ to $B_{16}$ obtained by multiplying the individual elements of a matrix indicating an IDFT of, for example, a 4×4 size by $\omega'_i$ are set to 0.

When the number of subcarriers is 8, the synthesizer 13 uses a transformation matrix in which elements other than the elements of diagonally positioned square matrices $B_1$ and $B_2$ obtained by multiplying the individual elements of a matrix indicating an IDFT of, for example, a 4×4 size by $\omega'_1$ and $\omega'_2$ are set to 0. The synthesizer 13 generates the baseband signal by multiplying a transformation matrix by a subcarrier modulation signal d as expressed by the following equation (9). $\omega$ in the following equation (9) is given by the following equation (10), and $\omega'_i$ by the following equation (11).

[Equation 9]

$$\frac{1}{\sqrt{4}}\begin{bmatrix} \omega'_1 & \omega'_1 & \omega'_1 & \omega'_1 & 0 & 0 & 0 & 0 \\ \omega'_1 & \omega^1 \cdot \omega'_1 & \omega^2 \cdot \omega'_1 & \omega^3 \cdot \omega'_1 & 0 & 0 & 0 & 0 \\ \omega'_1 & \omega^2 \cdot \omega'_1 & \omega^4 \cdot \omega'_1 & \omega^6 \cdot \omega'_1 & 0 & 0 & 0 & 0 \\ \omega'_1 & \omega^3 \cdot \omega'_1 & \omega^6 \cdot \omega'_1 & \omega^9 \cdot \omega'_1 & 0 & 0 & 0 & 0 \\ 0 & 0 & 0 & 0 & \omega'_2 & \omega'_2 & \omega'_2 & \omega'_2 \\ 0 & 0 & 0 & 0 & \omega'_2 & \omega^1 \cdot \omega'_2 & \omega^2 \cdot \omega'_2 & \omega^3 \cdot \omega'_2 \\ 0 & 0 & 0 & 0 & \omega'_2 & \omega^2 \cdot \omega'_2 & \omega^4 \cdot \omega'_2 & \omega^6 \cdot \omega'_2 \\ 0 & 0 & 0 & 0 & \omega'_2 & \omega^3 \cdot \omega'_2 & \omega^6 \cdot \omega'_2 & \omega^9 \cdot \omega'_2 \end{bmatrix} \quad (9)$$

$$\begin{bmatrix} d_0 \\ d_1 \\ d_2 \\ d_3 \\ d_4 \\ d_5 \\ d_6 \\ d_7 \end{bmatrix}$$

[Equation 10]

$$\omega = \exp\left(j\frac{\pi}{2}\right) \quad (10)$$

[Equation 11]

$$\omega'_i = \exp\left(-j\frac{i\pi}{8}\right) (i=1, 2) \quad (11)$$

The reception transformation matrix that is used by the decomposer 33 is an inverse matrix of the transformation matrix used by the synthesizer 13, and has a structure similar to the transformation matrix shown in FIG. 5. It is to be noted however that each of the square matrices $B_1$ to $B_p$ is a matrix obtained by multiplying the individual elements of a matrix indicating a DFT (Discrete Fourier Transformation) having m rows and m columns by a complex trigonometric function $\omega''_i$ whose phase is a value $\theta_i$ determined for each square matrix given by the following equation (12). The value $\theta_i$ in use is a value obtained by multiplying the number i identifying a square matrix by the phase π of the half period of subcarriers and dividing the resultant value by the number of rows, N, of the transformation matrix, as given by the aforementioned equation (8).

[Equation 12]

$$\omega''_i = \exp(j\theta_i)(i=1,2,\ldots,p) \quad (12)$$

When the number of subcarriers is 64, the decomposer 33 generates a subcarrier modulation signal from the baseband signal using a transformation matrix in which elements other than the elements of diagonally positioned square matrices $B_1$ to $B_{16}$ obtained by multiplying the individual elements of a matrix indicating a DFT of a 4×4 size by $\omega''_i$ are set to 0.

When the number of subcarriers is 8, the decomposer 33 uses a reception transformation matrix in which elements other than the elements of diagonally positioned square matrices $B_1$ and $B_2$ obtained by multiplying the individual elements of a matrix indicating a DFT of, for example, a 4×4 size by $\omega''_1$ and $\omega''_2$ are set to 0. The decomposer 33 generates the subcarrier modulation signal by multiplying a reception transformation matrix by a signal r obtained by parallelization of the baseband signal as expressed by the following equation (13). ω in the following equation (13) is given by the aforementioned equation (10), and $\omega''_i$ by the following equation (14).

[Equation 13]

$$\frac{1}{\sqrt{4}}\begin{bmatrix} \omega''_1 & \omega''_1 & \omega''_1 & \omega''_1 & 0 & 0 & 0 & 0 \\ \omega''_1 & \omega^{-1} \cdot \omega''_1 & \omega^{-2} \cdot \omega''_1 & \omega^{-3} \cdot \omega''_1 & 0 & 0 & 0 & 0 \\ \omega''_1 & \omega^{-2} \cdot \omega''_1 & \omega^{-4} \cdot \omega''_1 & \omega^{-6} \cdot \omega''_1 & 0 & 0 & 0 & 0 \\ \omega''_1 & \omega^{-3} \cdot \omega''_1 & \omega^{-6} \cdot \omega''_1 & \omega^{-9} \cdot \omega''_1 & 0 & 0 & 0 & 0 \\ 0 & 0 & 0 & 0 & \omega'_2 & \omega'_2 & \omega'_2 & \omega'_2 \\ 0 & 0 & 0 & 0 & \omega''_2 & \omega^{-1} \cdot \omega''_2 & \omega^{-2} \cdot \omega''_2 & \omega^{-3} \cdot \omega''_2 \\ 0 & 0 & 0 & 0 & \omega''_2 & \omega^{-2} \cdot \omega''_2 & \omega^{-4} \cdot \omega''_2 & \omega^{-6} \cdot \omega''_2 \\ 0 & 0 & 0 & 0 & \omega''_2 & \omega^{-3} \cdot \omega''_2 & \omega^{-6} \cdot \omega''_2 & \omega^{-9} \cdot \omega''_2 \end{bmatrix} \cdot \begin{bmatrix} r_0 \\ r_1 \\ r_2 \\ r_3 \\ r_4 \\ r_5 \\ r_6 \\ r_7 \end{bmatrix} \quad (13)$$

[Equation 14]

$$\omega''_i = \exp\left(j\frac{i\pi}{8}\right) (i=1, 2) \quad (14)$$

As in the case of the transformation matrix, the individual square matrices in the reception transformation matrix may have different numbers of rows and columns.

As described above, the communication apparatus 1 according to the second embodiment of the invention uses a transformation matrix which is acquired by adding a mathematical change different to that added in the first embodiment to a matrix indicating an IDFT to suppress an increase in PAPR which is caused by an increase in the number of subcarriers in OFDM communication, thereby simplifying the process of suppressing an increase in PAPR. As will be described later, the communication apparatus 1 according to the second embodiment can improve the degree of reduction in PAPR as compared to the communication apparatus 1 according to the first embodiment.

Next, advantages of the embodiments according to the invention will be described referring to simulation results. The generation of baseband signals based on a matrix indicating an IDFT, the transformation matrix in the description of the first embodiment, and the transformation matrix in the description of the second embodiment was simulated. A random signal was used as an input signal, QPSK was used as a modulation scheme, and the number of rows and the number of columns of each square matrix were set to 4. The PAPR characteristics were compared while changing the number of subcarriers and the number of rows and the number of columns of a matrix indicating an IDFT and a transformation matrix to 8, 16, 32, 64, 128, 256, 512, 1024 and 2048.

Figure 6:
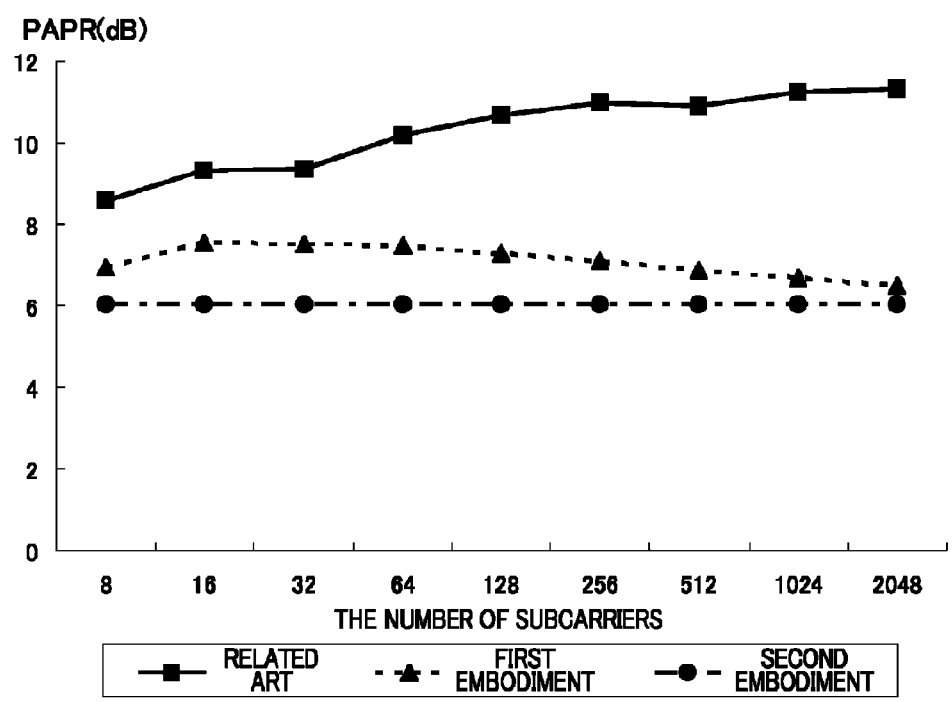
FIG. 6 is a diagram illustrating the PAPR characteristics of simulated baseband signals.

FIG. 6 is a diagram illustrating the PAPR characteristics of the simulated baseband signals. The abscissa represents the number of subcarriers, and the ordinate represents the PAPR (unit: dB). A baseband signal was generated using a random signal as an input signal, and the PAPR of the baseband signal was calculated. This process was repeated 3000 times to calculate the PAPR average, which was plotted. A solid-line graph showing the plot points by squares represents of the PAPR when using a matrix indicating an IDFT as done according to the related art. A dotted-line graph showing the plot points by triangles represents the PAPR when using the transformation matrix illustrated in the description of the first embodiment. A dashed-line graph showing the plot points by round dots represents the PAPR when using the transformation matrix illustrated in the description of the second embodiment.

When a matrix indicating an IDFT was used as done according to the related art, the PAPR increased with an increase in the number of subcarriers, whereas when the illustrated transformation matrices according to the first and second embodiments were used, an increase in the PAPR with an increase in the number of subcarriers was suppressed. When the number of subcarriers is 8, the PAPR average according to the related art was 8.6 dB, the PAPR average according to the first embodiment was 6.9 dB, and the PAPR average according to the second embodiment was 6.0 dB, showing a reduction in PAPR in case of using the illustrated transformation matrices according to the first and second embodiments. When the number of subcarriers is 2048, the PAPR average according to the related art was 11.3 dB, the PAPR average according to the first embodiment was 6.5 dB, and the PAPR average according to the second embodiment was 6.0 dB, also showing a reduction in PAPR in case of increasing the number of subcarriers. The PAPR average according to the second embodiment took a constant value regardless of the number of subcarriers.

Figure 7A:
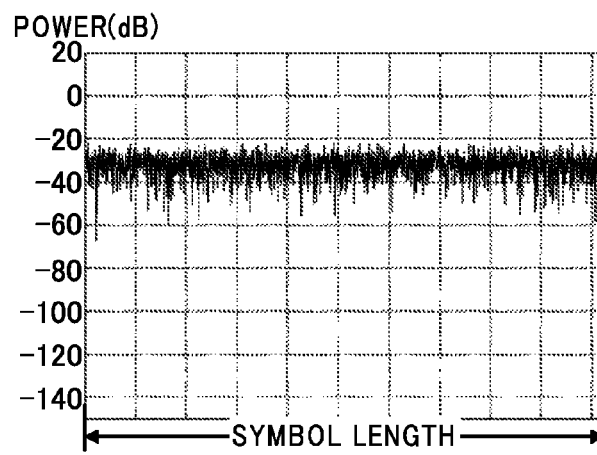
FIGS. 7A, 7B and 7C are diagrams showing the spectra of simulated baseband signals.
Figure 7B:
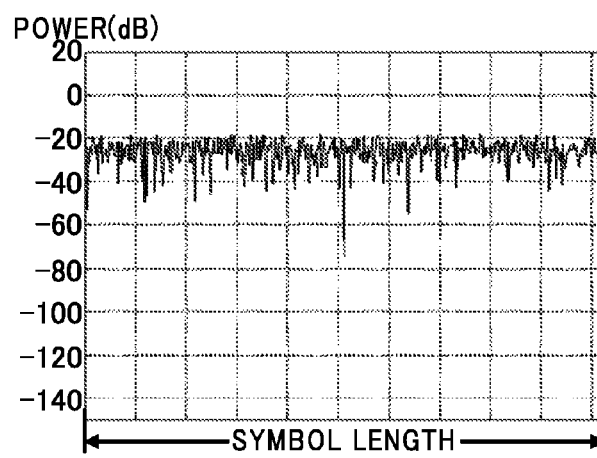
Figure 7C:
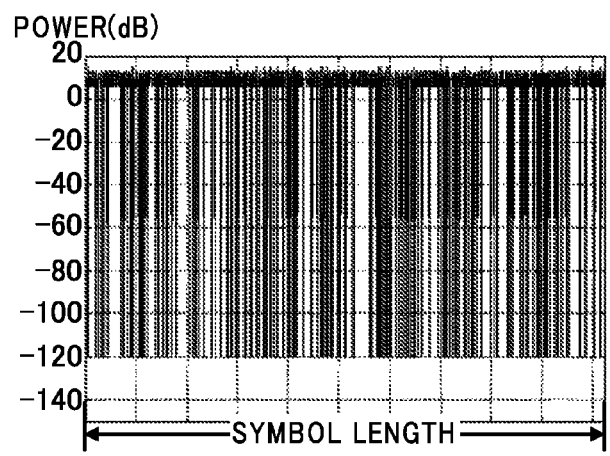

FIGS. 7A, 7B and 7C are diagrams showing the spectra of the simulated baseband signals. The abscissa represents the symbol length (time), and the ordinate represents power (unit: dB). A random signal was used as an input signal, QPSK was used as a modulation scheme, and the number of rows and the number of columns of each square matrix were set to 4. The spectra of the baseband signals were calculated with the number of subcarriers and the number of rows and the number of columns of a matrix indicating an IDFT and a transformation matrix being set to 2048. FIG. 7A shows the spectrum of the baseband signal when using a matrix indicating an IDFT as done according to the related art, FIG. 7B shows the spectrum of the baseband signal when using the illustrated transformation matrix according to the first embodiment, and FIG. 7C shows the spectrum of the baseband signal when using the illustrated transformation matrix according to the second embodiment.

A point where power becomes −120 dB in FIG. 7C shows that the results of calculating the spectrum diverge. Because an actual communication apparatus does not show divergence originating from the influence of Gaussian noise, correction was made in the simulation so that the results of spectrum calculation do not diverge.

When the illustrated transformation matrix according to the first embodiment shown in FIG. 7B was used, the efficiency of frequency usage did not show a significant difference as compared with the case of using a matrix indicating an IDFT as done according to the related art. When the illustrated transformation matrix according to the second embodiment shown in FIG. 7C was used, however, there were multiple discontinuous points in the spectrum, the efficiency of frequency usage became lower.

Therefore, the first and second embodiments of the invention can suppress an increase in PAPR which is caused by an increase in the number of subcarriers. The second embodiment according to the invention keeps the PAPR constant, and can thus make the PAPR lower than the first embodiment according to the invention. It is to be noted however that the second embodiment has a lower efficiency of frequency usage than the first embodiment.

In addition, the CCDF (Complementary Cumulative Distribution Function) of the PAPR, i.e., the characteristic of the probability of occurrence of the PAPR, according to the related art was compared with the CCDF of the PAPR according to the first embodiment. A baseband signal was generated using a random signal as an input signal, using QPSK as a modulation scheme, and setting the number of rows and the number of columns of a matrix indicating an IDFT and a transformation matrix according to the first embodiment to 2048. The simulation was conducted on the first embodiment in a case where the number of rows and the number of columns of each square matrix was set to 4 and in a case where the number of rows and the number of columns of each square matrix was set to 8.

Figure 8:
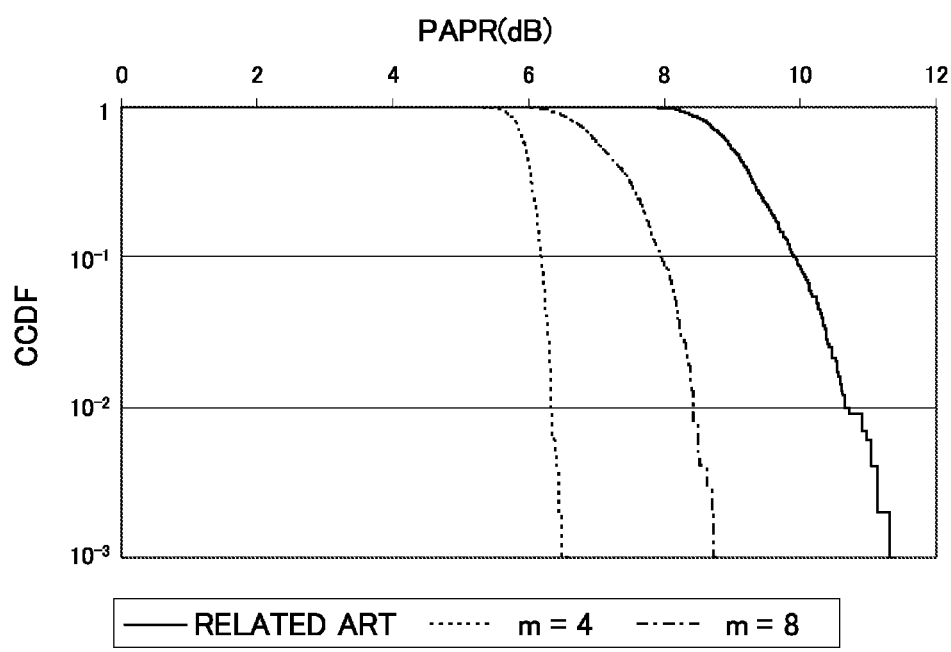
FIG. 8 is a diagram illustrating simulated CCDF characteristics of the PAPRs of baseband signals.

FIG. 8 is a diagram illustrating simulated CCDF characteristics of the PAPRs of baseband signals. The abscissa represents the PAPR (unit: dB), and the ordinate represents the CCDF of the PAPR. A solid-line graph represents the CCDF characteristic of the PAPR according to the related art. A dotted-line graph represents the CCDF characteristic of the PAPR according to the first embodiment with the number of rows and the number of columns of each square matrix being set to 4. A dashed-line graph represents the CCDF characteristic of the PAPR according to the first embodiment with the number of rows and the number of columns of each square matrix being set to 8.

Within the illustrated range, the PAPRs according to the first embodiment of the invention were improved as compared with the PAPR according to the related art. Decreasing the value of m made the PAPR lower according to the embodiment. This is because increasing the value of m makes a transformation matrix closer to a matrix indicating an IDFT and the CCDF characteristic also closer to that in the related art, whereas, decreasing the value of m makes a difference between a transformation matrix and a matrix indicating an IDFT larger and improves the CCDF characteristic as compared to that in the related art.

The modes of the invention are not limited to the foregoing embodiments. The modulation scheme of the modulator 11 is not limited to QPSK, but PSK (Phase Shift Keying), QAM (Quadrature Amplitude Modulation) or the like other than QPSK may be used as well. The layout order of the modulator 11 and the serial-parallel converter 12 may be changed so that the serial-parallel converter 12 performs serial-parallel conversion on an input signal and allocates the parallel signal to subcarrier signals, and then the modulator 11 modulates individual pieces of data in the parallel signal by a predetermined modulation scheme. In this case, a demodulation process is carried out on the reception side with the layout order of the demodulator 31 and the parallel-serial converter 32 being changed. The coefficients in the transformation matrix and the reception transformation matrix are not limited to those used in the foregoing embodiments, the coefficients of one of the transformation matrix used on the transmission side and the reception transformation matrix used on the reception side may be set to 1, and the other coefficients may be set to 1/N.

Square matrices are diagonally positioned in the transformation matrix and the reception transformation matrix which are used by the communication apparatus 1 according to each of the foregoing embodiments, which means that square matrices are diagonally positioned when subcarrier modulation signals are aligned in a certain order. FIGS. 9A and 9B are diagrams illustrating transformation examples of elements of a transformation matrix according to the embodiments. When the number of rows and the number of columns of the transformation matrix are 8, and the number of rows and the number of columns of each square matrix are 2, for example, the calculation result shown in FIG. 9A of multiplying the transformation matrix by the subcarrier modulation signal d matches with the calculation result shown in FIG. 9B of multiplying the transformation matrix by a subcarrier modulation signal d' obtained by changing the order of the individual elements of the subcarrier modulation signal d. The subcarrier modulation signal d' in FIG. 9B is the subcarrier modulation signal d the order of whose elements is changed so that square matrices in the transformation matrix are diagonally positioned. The individual elements of the subcarrier modulation signal d' are expressed by the following equation (15).

[Equation 15]

$$\begin{bmatrix} d'_0 \\ d'_1 \\ d'_2 \\ d'_3 \\ d'_4 \\ d'_5 \\ d'_6 \\ d'_7 \end{bmatrix} = \begin{bmatrix} d_0 \\ d_1 \\ d_6 \\ d_7 \\ d_2 \\ d_3 \\ d_4 \\ d_5 \end{bmatrix} \quad (15)$$

That square matrices are diagonally positioned in the transformation matrix and the reception transformation matrix according to the embodiments of the invention means that square matrices are diagonally positioned when subcarrier modulation signals are aligned in a certain order. Each diagonal element in the transformation matrix and the reception transformation matrix belongs to only a single square matrix. That is, diagonally positioned square matrices do not overlap one another.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. A communication apparatus for communicating with another apparatus in orthogonal frequency-division multiplexing wireless communication, the communication apparatus comprising:
a modulator that modulates an input signal by a predetermined modulation scheme, and assigns the modulated input signal to subcarriers with frequency components orthogonal to each other, thereby generating a subcarrier modulation signal;
a synthesizer that generates a baseband signal from the subcarrier modulation signal using a predetermined transformation matrix to modulate the subcarrier modulation signal with the subcarriers, the predetermined transformation matrix being a non-singular matrix with predetermined elements of 0; and
a transmitter that generates a transmission signal from the baseband signal, and transmits the transmission signal;
wherein the transformation matrix is a matrix in which elements other than elements of a plurality of square matrices diagonally positioned in the transformation matrix are 0, a sum of numbers of rows and a sum of numbers of columns of the plurality of square matrices coincide with a number of rows and a number of columns of the transformation matrix, and each element of each of the square matrices has a value obtained by multiplying each element in a matrix having a same size as that of the each square matrix and indicating inverse discrete Fourier transformation by a complex trigonometric function having, as a phase, a value determined for each of the square matrices but with an inverted sign.

2. The communication apparatus according to claim 1, wherein the value determined for each of the square matrices is a value obtained by multiplying a number identifying the square matrix by a phase of a half period of the subcarriers and dividing by the number of rows of the transformation matrix.

3. A communication apparatus for communicating with another apparatus in orthogonal frequency-division multiplexing wireless communication, the communication apparatus comprising:
a receiver that receives a transmission signal and generates a baseband signal;
a decomposer that generates a subcarrier modulation signal from the baseband signal using a reception transformation matrix which is an inverse matrix of a predetermined transformation matrix to modulate the subcarrier modulation signal with subcarriers, the predetermined transformation matrix being a non-singular matrix with predetermined elements of 0; and
a demodulator that demodulates the subcarrier modulation signal by a predetermined demodulation method;
wherein the reception transformation matrix is a matrix in which elements other than elements of a plurality of square matrices diagonally positioned in the reception transformation matrix are 0, a sum of numbers of rows and a sum of numbers of columns of the plurality of square matrices coincide with a number of rows and a number of columns of the reception transformation matrix, and each element of each of the square matrices has a value obtained by multiplying each element in a matrix having a same size as that of the each square matrix and indicating discrete Fourier transformation by a complex trigonometric function having, as a phase, a value determined for each of the square matrices.

4. The communication apparatus according to claim 3, wherein the value determined for each of the square matrices is a value obtained by multiplying a number identifying the square matrix by a phase of a half period of the subcarriers and dividing by the number of rows of the reception transformation matrix.

5. A communication method that is executed by a communication apparatus communicating with another apparatus in orthogonal frequency-division multiplexing wireless communication, the communication method comprising:
  a modulation step of modulating an input signal by a predetermined modulation scheme, and assigning the modulated input signal to subcarriers with frequency components orthogonal to each other, thereby generating a subcarrier modulation signal;
  a synthesizing step of generating a baseband signal from the subcarrier modulation signal using a predetermined transformation matrix to modulate the subcarrier modulation signal with the subcarriers, the predetermined transformation matrix being a non-singular matrix with predetermined elements of 0; and
  a transmission step of generating a transmission signal from the baseband signal, and transmitting the transmission signal;
  wherein the transformation matrix is a matrix in which elements other than elements of a plurality of square matrices diagonally positioned in the transformation matrix are 0, a sum of numbers of rows and a sum of numbers of columns of the plurality of square matrices coincide with a number of rows and a number of columns of the transformation matrix, and each element of each of the square matrices has a value obtained by multiplying each element in a matrix having a same size as that of the each square matrix and indicating inverse discrete Fourier transformation by a complex trigonometric function having, as a phase, a value determined for each of the square matrices but with an inverted sign.

6. A communication method that is executed by a communication apparatus communicating with another apparatus in orthogonal frequency-division multiplexing wireless communication, the communication method comprising:
  a reception step of receiving a transmission signal and generating a baseband signal;
  a decomposing step of generating a subcarrier modulation signal from the baseband signal using a reception transformation matrix which is an inverse matrix of a predetermined transformation matrix to modulate the subcarrier modulation signal with subcarriers, the predetermined transformation matrix being a non-singular matrix with predetermined elements of 0; and
  a demodulation step of demodulating the subcarrier modulation signal by a predetermined demodulation method;
  wherein the reception transformation matrix is a matrix in which elements other than elements of a plurality of square matrices diagonally positioned in the reception transformation matrix are 0, a sum of numbers of rows and a sum of numbers of columns of the plurality of square matrices coincide with a number of rows and a number of columns of the reception transformation matrix, and each element of each of the square matrices has a value obtained by multiplying each element in a matrix having a same size as that of the each square matrix and indicating discrete Fourier transformation by a complex trigonometric function having, as a phase, a value determined for each of the square matrices.

* * * * *